April 19, 1960  C. H. HAMILTON  2,933,087
SYRINGE
Filed Oct. 4, 1957

CLARK H. HAMILTON
INVENTOR.

BY *J. C. Baisch*
ATTORNEY

United States Patent Office 2,933,087
Patented Apr. 19, 1960

2,933,087

SYRINGE

Clark H. Hamilton, Whittier, Calif.

Application October 4, 1957, Serial No. 688,312

8 Claims. (Cl. 128—218)

This invention relates generally to liquid measuring devices and relates more particularly to syringes for measuring very small quantities of liquid.

While the invention has particular utility in connection with syringes for the measuring and injection of very small quantities of liquid, and is shown and described in such connection, it is to be understood that its utility is not confined thereto.

It is an object of the present invention to provide an accurate and serviceable primary measuring device with which the operator may measure and discharge directly, without mechanical aids, liquids in very small volumes.

The invention is very useful in vapor chromatography as a primary measuring and liquid introducing device of a liquid sample which is then separated into its individual components; and is also useful as a primary measuring device in chemistry in making dilutions.

It serves also as a variable measuring instrument which precisely measures a liquid which then may be injected without transfer or loss, directly into an analytical device, small animals, such as mice and the like, and large insects such as grasshoppers et cetera.

Another object of the invention is to provide a device of this character adapted to inject liquids at a relatively high pressure.

Another object of the invention is to provide a device of this character adapted to develop relatively high pressures without leakage.

Still another object of the invention is to provide a device of this character that is extremely accurate.

A further object of the invention is to provide a device of this character having effective reinforcing means for the needle.

A still further object of the invention is to provide a device of this character having an improved point on the needle which minimizes cutting of a rubber diaphragm through which needle may be forced and eliminates coring of the diaphragm so that many penetrations of said diaphragm may be made without undue leakage.

Another object of the invention is to provide a device of this character that is sturdy and serviceable with breakage reduced to a minimum.

The characteristics and advantages of the invention are further sufficiently referred to in connection with the following detailed description of the accompanying drawings which illustrate an exemplary embodiment. After considering this example, skilled persons will understand that many variations may be made without departing from the principles disclosed, and I contemplate the employment of any structures, arrangements or modes of operation that are properly within the scope of the appended claims.

Referring to the drawings.

Figure 2:
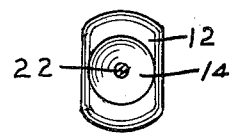
Fig. 2 is an enlarged view taken on line 2—2 of Fig. 1.
Figure 3:
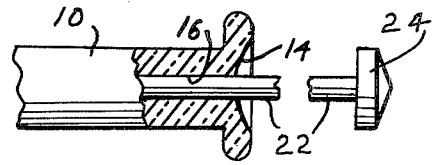
Fig. 3 is an enlarged fragmentary view of the handle end of the device with a portion thereof broken away.

Referring more particularly to the drawings, the device comprises a barrel 10 of suitable material, glass being found to be very satisfactory. There is an outwardly extending flange 12 at one end, said flange serving as a handle and being generally oval shaped as best shown in Fig. 2. At the outer side of the flanges there is provided a concave recess 14 from he bottom of which a bore 16 extends longitudinally in the barrel, terminating adjacent the opposite or discharge end of said barrel. From the inner end of said bore 16 a reduced diameter bore 18 extends outwardly through a tip 20, said bore 18 being concentric with said tip.

The device has a plunger 22 of suitable material, stainless steel spring wire, which is, of course, resilient, being found particularly effective. The inner end or tip of the plunger is plated with hard chrome. The other end of the plunger extends outwardly of the handle end of the barrel and is provided with a disc 24 which is spaced somewhat from the adjacent end of said barrel, the disc 24 serving as a pressure member for the thumb of the operator.

The plunger and the interior bore of the barrel are precisely round and free of taper and are closely fitted, this fit being known as a "slight interference," so that liquid in the bore may be subjected to a relatively high pressure, such as 150 pounds per square inch for over half a minute, without apparent leakage.

A scale 26 is provided on the exterior of the barrel and said scale is made extremely accurate so that the volume of liquid discharged may be read to one half (½) of 1% or better. The inner end and/or tip of the plunger 22 is adjusted by grinding to precisely stop at the zero mark on the scale.

The device has a needle assembly, indicated generally at 29, comprising an outer tube 28 and an inner tube or hollow needle 30 with the usual longitudinal passage therethrough, disposed within said tube 28 and extending outwardly beyond the outer end thereof. The outer end of tube 30 is pointed, as at 32, and the two parts of the assembly are sealingly welded together at the end opposite said point 32, the welding being indicated at 34, Fig. 4. The outer tube 28 reinforces the needle 30 so that breakage or bending of the needle is substantially eliminated.

It is to be understood that the inner ends of said tubes 28 and 30 terminate in substantially the same plane and constitute the inner end of the assembly. The inner end portion of the assembly is received within the reduced diameter bore 18 and is cemented therein by means of any well-known cement, the inner end of the assembly terminating at the zero mark of the scale 26. Welding of the tubes at their inner ends prevents annealing of the needle point 32 and thus eliminates weakening thereof.

Figure 1:
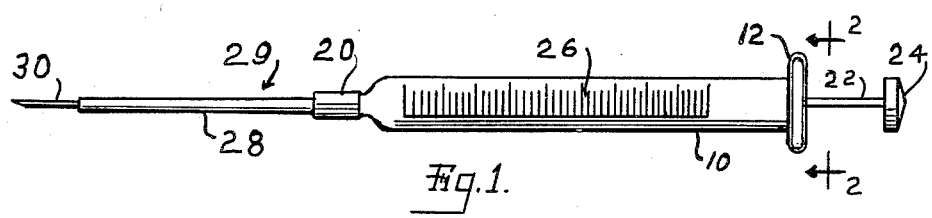
Fig. 1 is an elevational view of a device embodying the present invention.
Figure 4:
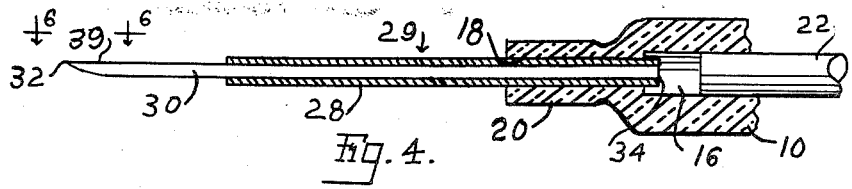
Fig. 4 is an enlarged fragmentary view of the opposite end of the device with portions broken away to show the interior construction and arrangement of certain parts.
Figure 6:
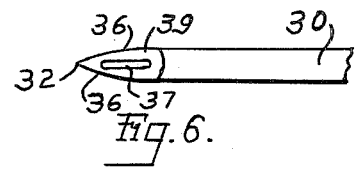
Fig. 6 is an enlarged view taken on line 6—6 of Fig. 4.
Figure 5:
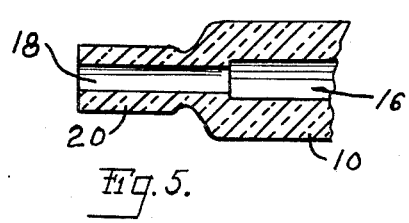
Fig. 5 is an enlarged fragmentary view of the discharge end of the device without a needle.

The needle point 32 is formed in the usual manner with a taper, except that it is sharpened as a sewing needle with the edges 36 buffed dull. The outer end opening 37 of the needle 30 terminates at the surface 39 of said needle 30 and in making the needle the surface 39 is first cut or formed at an angle so that it is initially beveled, and thereafter the point of said needle is bent somewhat toward the side so as to sufficiently protect said end opening 37 and eliminate coring thereby of a rubber diaphragm or the like through which the needle is forced, the needle then being as shown in Figs. 1, 4 and 6. The edges 36 are again buffed smooth to eliminate any sharp cutting edges, only the tip of the point being sharp. This arrangement minimizes cutting of rubber diaphragms and, in connection with the elimination of coring of the diaphragm, makes possible many penetrations of a diaphragm with this needle without undue leakage.

The device is adapted to hold as small a volume of fluid as .01 cc. and accurate scale readings directly to .0002 cc. are possible. Also, the cemented concentric needle assembly gives an extremely small dead volume within the bore 16, approximately .003 cc.

Adjusting the plunger so the inner end thereof stops exactly at the zero mark of the scale is effected by grinding the tip of the inner end. With barrel bore sizes as small as those of the present invention the inner end of the bore 16 may be slightly rounded when the barrel is formed and not have a sharply defined shoulder. If the inner tip of the plunger will not go clear to the zero mark on the scale, the tip is slightly beveled by grinding until it exactly coincides with said zero mark when fully inserted into the bore 16.

Should the inner tip of the plunger go beyond the zero mark, it is used in a syringe having a needle and as the inner end of the needle assembly is cemented in the bore 18 of the tip 20 with the inner end of said assembly exactly at the zero mark, said assembly end serves as a stop for the plunger so that the tip of the latter exactly coincides with said zero mark.

It is though that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the form hereinbefore described being merely for the purpose of disclosing one embodiment.

I claim:

1. A syringe, comprising: an elongated glass barrel having a reduced diameter axially arranged tip at one end thereof; an outwardly extending generally oval flange at the opposite end of said barrel, there being a concave recess in the outer side of said flange, from the bottom of which a relatively small bore extends longitudinally of said barrel, said bore terminating adjacent the opposite end of the barrel and from which a reduced diameter bore extends outwardly through said tip; a plunger of spring wire operably disposed in said bore and having the inner tip thereof plated with hard material, said plunger, when fully inserted in said bore, having an outer end portion projecting outwardly of the adjacent end of the barrel; a disc on the outer end of the plunger, said plunger and the interior bore of the barrel being precisely round and closely fitted with a "slight interference"; a scale on said barrel having the zero mark adjacent the inner end of the barrel bore; a needle assembly comprising an outer tube, and an inner needle having a longitudinal passageway therethrough, said needle being disposed within said tube with a portion of the needle projecting longitudinally outwardly beyond one end of said tube, the opposite end of the tube and needle being in substantially the same plane normal to their axes, the latter ends being welded to form a complete seal between said tube and said needle, the welded end portion of said assembly being received in the reduced diameter bore through the tip and being cemented therein with the inner end of the assembly positioned at the zero mark of the scale, the inner end of said plunger also being positioned at said part of the scale when fully inserted in the barrel bore, the projecting end of the needle being tapered at one side with the outer end of the passage through the needle terminating at said side, the tip of said needle being sharp and turned toward the tapered side to protect the outer end opening of the needle passage to prevent coring thereby, the edges of said tapered part of the needle being dull.

2. A syringe, comprising: an elongated glass barrel having a reduced diameter axially arranged tip at one end thereof; an outwardly extending flange at the opposite end of said barrel, there being a concave recess in the outer side of said flange from the bottom of which a relatively small bore extends longitudinally of said barrel, said bore terminating adjacent the opposite end of the barrel and from which a reduced diameter bore extends outwardly through said tip; a plunger of spring wire operably disposed in said bore and having the inner tip thereof plated with hard material, said plunger, when fully inserted in said bore, having an outer end portion projecting outwardly of the adjacent end of the barrel; a disc on the outer end of the plunger, said plunger and the interior bore of the barrel being precisely round and closely fitted with a "slight interference"; a scale on said barrel having the zero mark adjacent the inner end of the barrel bore; a needle assembly comprising an outer tube, and an inner tubular needle having a longitudinal passageway therethrough, said needle being disposed within said tube with a portion of the needle projecting longitudinally outwardly beyond one end of said tube, the opposite end of the tube and needle being welded to form a complete seal between said tube and said needle, the welded end portion of said assembly being received in the reduced diameter bore through the tip and being sealingly secured therein with the inner end of the assembly positioned at the zero mark of the scale, the inner end of said plunger also being positioned at said part of the scale when fully inserted in the barrel bore, the projecting end of the needle being tapered at one side with the tip sharp and the edges of said tapered side dull.

3. A syringe, comprising: an elongated barrel having a tip at one end thereof; an outwardly extending flange at the opposite end of said barrel, there being a relatively small bore extending longitudinally of said barrel from the flange end, said bore terminating adjacent the opposite end of the barrel and from which a reduced diameter bore extends outwardly through the tip; a plunger of spring wire operably disposed in said bore, said plunger, when fully inserted in said bore, having an outer end portion projecting outwardly of the adjacent end of the barrel; a disc on the outer end of the plunger, said plunger and the interior bore of the barrel being precisely round and closely fitted; a scale on said barrel having the zero mark adjacent the inner end of the barrel bore; a needle assembly comprising an outer tube, and an inner tubular needle having a longitudinal passageway therethrough, said needle being disposed within said tube with a portion of the needle projecting longitudinally outwardly beyond one end of said tube, the opposite end of the tube and needle being sealingly secured together, the latter end portion of said assembly being received in the bore through the tip and being sealingly secured therein with the inner end of the assembly positioned at the zero mark of the scale, the inner end of said plunger also being positioned at said part of the scale when fully inserted in the barrel bore.

4. A syringe, comprising: an elongated glass barrel having a reduced diameter axially arranged tip at one end thereof; an outwardly extending flange at the opposite end of said barrel, there being a concave recess in the outer side of said flange from the bottom of which a relatively small bore extends longitudinally of said barrel, said bore terminating adjacent the opposite end of the barrel and from which a reduced diameter bore extends outwardly through the tip; a plunger of spring wire operably disposed in said bore and having the inner tip thereof plated with a relatively hard material, said plunger, when fully inserted in said bore, having an outer end portion projecting outwardly of the adjacent end of the barrel; a disc on the outer end of the plunger, said interior bore of the barrel and the plunger being precisely round and closely fitted with a "slight interference"; and a scale on said barrel having the zero mark adjacent the inner end of the barrel bore.

5. A syringe, comprising: an elongated glass barrel having a tip at one end thereof; an outwardly extending flange at the opposite end of said barrel, there being a relatively small bore which extends longitudinally in said barrel from the flanged end thereof, said bore terminating adjacent the opposite end of the barrel and from which a reduced diameter bore extends outwardly through the tip; a plunger of spring wire operably disposed in the bore of the barrel, said plunger having at least part of its inner tip of relatively hard material and said plunger, when fully inserted in said barrel bore, having an outer end portion projecting outwardly of the adjacent end of the barrel and provided at the outer end with a pressure member, said interior bore of the barrel and plunger being precisely round and closely fitted with a "slight interference"; and a scale on said barrel having the zero mark adjacent the inner end of the barrel bore.

6. A syringe, including: an elongated glass barrel having a tip at one end thereof; an outwardly extending flange at the opposite end of said barrel from which a relatively small bore extends longitudinally of said barrel, said bore terminating adjacent the opposite end of the barrel and from which a passage extends outwardly through the tip; a plunger of spring wire operably disposed in said bore having at least a part of its inner tip of relatively hard material, said plunger, when fully inserted in said bore, having an outer end portion projecting outwardly of the adjacent end of the barrel with a pressure member on the outer end of said plunger, said interior bore of the barrel and a portion of the plunger being precisely round and closely fitted and a scale on said barrel having the zero mark adjacent the inner end of the barrel bore.

7. A syringe, comprising: an elongated glass barrel having a reduced diameter tip at one end thereof; an outwardly extending flange at the opposite end of said barrel from which a relatively small bore extends longitudinally of said barrel and said bore terminating adjacent the opposite end of the barrel and from which a passage extends outwardly through the tip; a plunger of spring wire operably disposed in said bore having at least a part of its inner tip of relatively hard material, said plunger, when fully inserted in said bore, having an outer end portion projecting outwardly of the adjacent end of the barrel with a pressure member on the outer end of said bore of the barrel and a portion of the plunger being precisely round and closely fitted to develop relatively high pressure; a scale on said barrel bore; and a needle operably carried by said barrel tip.

8. A syringe, comprising: an elongated barrel having a tip at one end thereof; an outwardly extending flange at the opposite end of said barrel, there being a relatively small bore extending longitudinally of the barrel from the flange end, said bore terminating adjacent the opposite end of the barrel from which a reduced diameter passage extends outwardly through the tip; a plunger of spring wire operably disposed in said bore, said plunger, when fully inserted in said bore, having an outer end portion projecting outwardly of the adjacent end of the barrel; a pressure member on the outer end of the plunger, said plunger and the interior bore of the barrel being precisely round and closely fitted; a scale on said barrel having the zero mark adjacent the inner end of the barrel bore; a needle assembly comprising an outer tube, and an inner tubular needle having a longitudinal passageway therethrough, said needle being disposed within said tube with a portion of the needle projecting longitudinally outwardly beyond one end of said tube, the opposite end of the tube and needle being sealingly secured together, the latter end portion of said assembly being sealingly secured in the passage of the tip, the inner end of the plunger being positioned at the zero mark of the scale when fully inserted in the barrel bore.

References Cited in the file of this patent
UNITED STATES PATENTS

| | | |
|---|---|---|
| 827,693 | Korb | July 31, 1906 |
| 2,015,970 | Schoene | Oct. 1, 1935 |
| 2,515,956 | Greenberg | July 18, 1950 |
| 2,638,897 | Poitras | May 19, 1953 |
| 2,717,600 | Huber | Sept. 13, 1955 |
| 2,746,454 | Sorensen | May 22, 1956 |
| 2,794,435 | Stevens | June 4, 1957 |

FOREIGN PATENTS

| | | |
|---|---|---|
| 577,367 | France | June 4, 1924 |